(12) United States Patent
Koda et al.

(10) Patent No.: US 10,468,846 B2
(45) Date of Patent: *Nov. 5, 2019

(54) DIE FOR TERMINALIZED ELECTRIC WIRE

(71) Applicant: YAZAKI CORPORATION, Tokyo (JP)

(72) Inventors: Yoshitaka Koda, Shizuoka (JP); Shigeo Mori, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 492 days.

This patent is subject to a terminal disclaimer.

(21) Appl. No.: 15/072,709

(22) Filed: Mar. 17, 2016

(65) Prior Publication Data

US 2016/0276792 A1 Sep. 22, 2016

(30) Foreign Application Priority Data

Mar. 20, 2015 (JP) .................. 2015-057598

(51) Int. Cl.
H01R 43/02 (2006.01)
B23K 11/16 (2006.01)
B23K 11/10 (2006.01)

(52) U.S. Cl.
CPC .......... H01R 43/0214 (2013.01); B23K 11/10 (2013.01)

(58) Field of Classification Search
None
See application file for complete search history.

(56) References Cited

U.S. PATENT DOCUMENTS

| 2,286,097 | A | * | 6/1942 | Johnson | ................ H01R 4/183 |
| | | | | | 29/505 |
| 5,191,710 | A | | 3/1993 | Fujimaki et al. | |
| 6,452,101 | B1 | | 9/2002 | Haramaki et al. | |
| 7,905,384 | B1 | * | 3/2011 | Spiegelberg | .......... H01M 2/305 |
| | | | | | 228/115 |
| 9,793,626 | B2 | * | 10/2017 | Koda | ..................... H01R 11/12 |
| 2009/0078447 | A1 | | 3/2009 | Brantsch et al. | |
| 2016/0268755 | A1 | | 9/2016 | Koda | |

FOREIGN PATENT DOCUMENTS

| DE | 10 2007 045 512 A1 | 4/2009 |
| DE | 10 2016 203 186 A1 | 9/2016 |
| JP | 64-46974 U | 3/1989 |

(Continued)

OTHER PUBLICATIONS

DE 10 2007 045512 English Machine Translation, attached as pdf.*

(Continued)

Primary Examiner — Brian D Keller
(74) Attorney, Agent, or Firm — Kenealy Vaidya LLP

(57) ABSTRACT

A die for a terminalized electric wire is provided with a first electrode, a hole forming jig, an electric wire pressing jig which surrounds a periphery of the first electrode, a second electrode and conductor accommodation parts. The conductor accommodation parts are recessed in molded inner wall surfaces at both sides of the electric wire pressing jig which holds a superposed configuration part in which the end side is superposed on the root side of the annular conductor in the vertical direction. A part of a molten conductor of the superposed configuration part flows into the conductor accommodation parts.

5 Claims, 11 Drawing Sheets

(56) References Cited

FOREIGN PATENT DOCUMENTS

| | | |
|---|---|---|
| JP | 4-249875 A | 9/1992 |
| JP | 2000-208172 A | 7/2000 |
| JP | 2014-220066 A | 11/2014 |
| WO | 2014/181698 A1 | 11/2014 |

OTHER PUBLICATIONS

Definitioin of Surround by Merriam Webster, Jun. 2018, found at https://www.merriam-webster.com/dictionary/surround.*
German Office Action for the related German Patent Application No. 10 2016 204 373.0 dated Mar. 24, 2017.
German Minutes of the Hearing in the corresponding German Patent Application No. 102016204373.0 dated Jan. 25, 2018.
Japanese Office Action for the related Japanese Patent Application No. 2015-057598 dated Mar. 28, 2017.

* cited by examiner

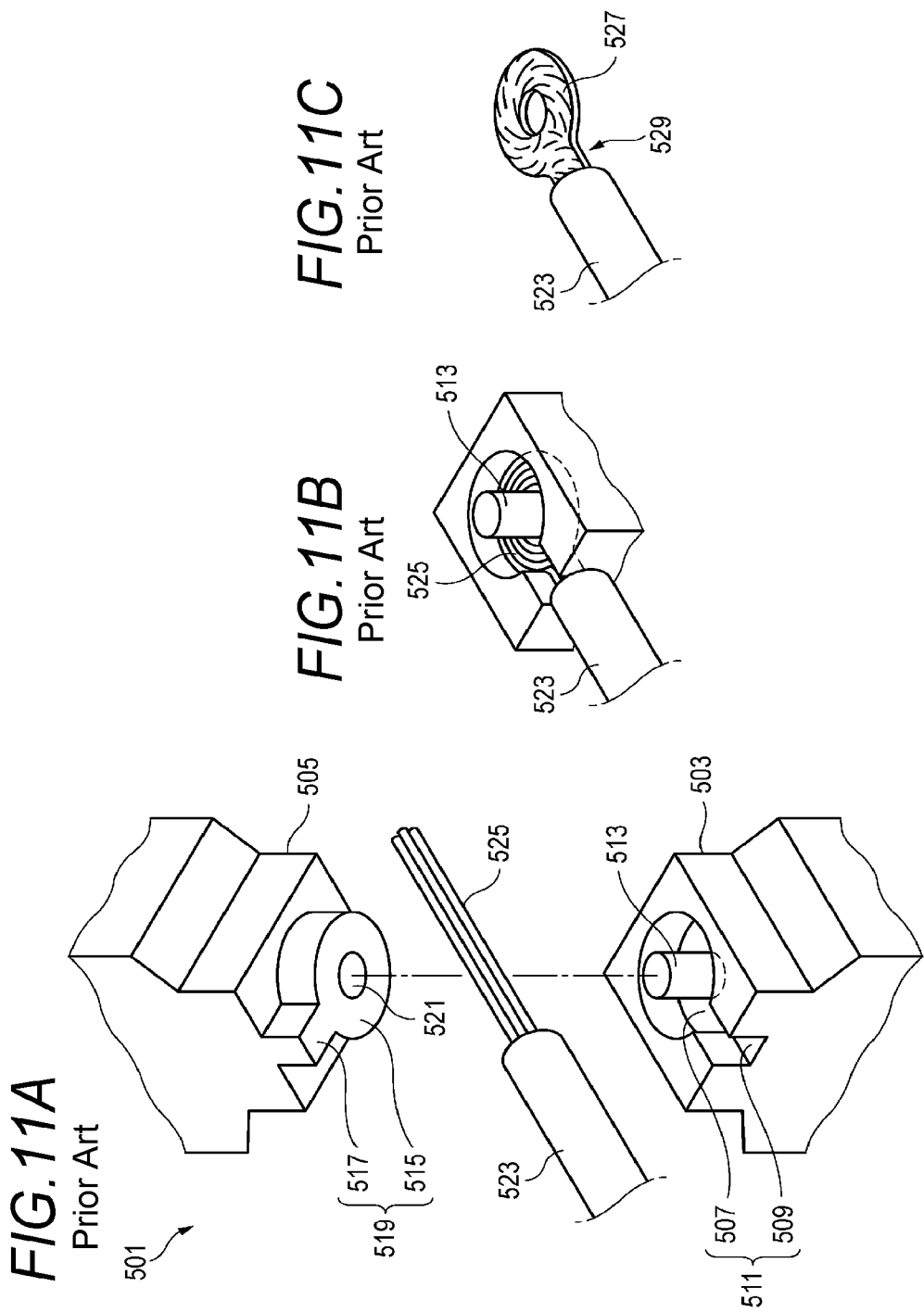

DIE FOR TERMINALIZED ELECTRIC WIRE

CROSS REFERENCE TO RELATED APPLICATIONS

This application claims priority from Japanese Patent Application No. 2015-057598 filed on Mar. 20, 2015, the entire contents of which are incorporated herein by reference.

BACKGROUND OF THE INVENTION

<Field of the Invention>

The present invention relates to a die for a terminalized electric wire.

<Description of Related Art>

A molding electrode and a terminalized electric wire are known which can easily and assuredly change a core element wire of an electric wire to a terminal (for instance, see Patent Literature 1: JP-A-4-249875).

As shown in FIG. 11A, the molding electrode 501 includes a female die press electrode 503 and a male die press electrode 505. The female die press electrode 503 has an electric wire accommodation groove 511 including an annular groove 507 and a cut out groove 509. In the center of the electric wire accommodation groove 511, a guide pin 513 for bending the electric wire is allowed to integrally stand upright. The male die press electrode 505 has an electric wire pressing protrusion 519 including an annular part 515 and a key shaped part 517. In the center of the annular part 515, an insert hole 521 corresponding to the guide pin 513 is provided. The electric wire pressing protrusion 519 is fitted to the electric wire accommodation groove 511 through a clearance.

As shown in FIG. 11B, core element wires 525 of the electric wire 523 are set in the electric wire accommodation groove 511 of the female die press electrode 503 to press the core element wires 525 by the electric wire pressing protrusion 519 of the male die press electrode 505. At the same time, an electric current is supplied to the female die press electrode 503 and the male die press electrode 505 to electrically conduct the female die press electrode 503 to the male die press electrode 505 and heat the core element wires 525. Thus, a terminalized electric wire 529 shown in FIG. 11C can be obtained in which an annular terminal part 527 is solidified.

[Patent Literature 1] JP-A-4-249875

The core element wires 525 accommodated in the electric wire accommodation groove 511 are configured in an annular conductor which is bent in an annular form. In the annular conductor, an end side of the core element wires 525 is superposed on a root side thereof in a vertical direction so as not to form a clearance. When the clearance is formed, a molten conductor is not sufficiently spread to a terminalized part, so that a shrinkage cavity or an outer shrinkage may be possibly formed in a molded product. However, a superposed configuration part in which the end side of the core element wires 525 is superposed on the root side thereof in the vertical direction has a cross-sectional area along a direction of superposition which is two times as large as that of other part. Accordingly, when opposed contact surfaces of the electric wire accommodation groove 511 or the electric wire pressing protrusion 519 are flat surfaces, a molten conductor (a molten core wire) is pushed out from a die matching part of the female die press electrode 503 and the male die press electrode 505. Thus, the terminalized electric wire 529 is liable to be insufficiently molded due to burrs or projections. Further, the core element wires 525 are wound on the guide pin 513 in the annular groove 507. At this time, between the above-described superposed configuration part and the guide pin 513, a space (a clearance) is formed. When such a clearance is formed, the molten conductor of a part which is naturally to become the annular terminal part 527 enters the clearance. As a result, an influence appears that a strength of the annular terminal part 527 is insufficient (a shortage of thickness) or a contact with a contact surface of a mate side is uneven in the annular terminal part 527. Thus, the terminalized electric wire 529 is also liable to be insufficiently molded.

SUMMARY

One or more embodiments provide a die for a terminalized electric wire which can effectively pressurize and heat an annular conductor to form an annular terminal part.

In an aspect (1), one or more embodiments provide a die for a terminalized electric wire provided with a first electrode, a hole forming jig, an electric wire pressing jig surrounding a periphery of the first electrode, a second electrode and conductor accommodation parts. An annular conductor of an electric wire with a coating removed and with an end side superposed on a root side in a vertical direction is mounted on the first electrode. The hole forming jig stands upright on the first electrode and passes through an inner hole of the annular conductor. The second electrode has a conductor-pressing protrusion which is fitted to a conductor-forming recessed part defined and formed by the first electrode and the electric wire pressing jig so as to pressurize and heat the annular conductor between the first electrode and the second electrode. The conductor accommodation parts are recessed in molded inner wall surfaces at both sides of the electric wire pressing jig which holds a superposed configuration part in which the end side of the annular conductor is superposed on the root side of the annular conductor in the vertical direction. A part of a molten conductor of the superposed configuration part flows into the conductor accommodation parts.

According to the aspect (1), an annular conductor of an electric wire in which a coating is removed and an end side is superposed on a root side in a vertical direction is mounted on a first electrode. Into an inner hole of the annular conductor, a hole forming jig of the first electrode passes through. An electric wire pressing jig arranged so as to surround a periphery of the first electrode defines and forms a conductor-forming recessed part by cooperating with the first electrode of a bottom side. To an opening side of the conductor-forming recessed part an upper part of which is opened, a conductor-pressing protrusion of a second electrode is fitted from an upper part. The conductor-pressing protrusion of the second electrode is fitted to the conductor-forming recessed part under a prescribed pressure and a voltage is applied between the first electrode and the second electrode. Accordingly, the annular conductor arranged in the conductor-forming recessed part is temporarily fused by Joule heat in a cavity (a space part) which is surrounded by the conductor-forming recessed part and the conductor-pressing protrusion to form a product, and then, solidified and molded by following an inner configuration of the cavity which forms and molds the product. At this time, in the annular conductor, a superposed configuration part is more swollen than other part. The swollen configuration is fused or molten to be lowered by a resistance welding. The molten conductor of the lowered part in the superposed configuration part flows into a conductor accommodation part recessed in a molded inner wall surface of the electric wire pressing jig. Thus, a volume of the molten annular conductor is not larger than a volume of the cavity. As a result, in the annular conductor, the molten conductor of the superposed configuration part is accommodated in the cavity without forming burrs or projections, so that an annular terminal part is finely terminalized.

In an aspect (2), the hole forming jig has a clearance intruding bulge part which fills a clearance formed between the hole forming jig and an inner surface of the superposed configuration part.

According to the aspect (2), the annular conductor is mounted on the first electrode and the hole forming jig of the first electrode passes through the inner hole of the annular conductor. Then, into a clearance formed between the hole forming jig and an inner surface of the superposed configuration part, a clearance intruding bulge part formed in the hole forming jig enters. Thus, the clearance is not formed between the inner surface of the superposed configuration part and the hole forming jig. As a result, the molten conductor is prevented from flowing into the clearance, so that an insufficient strength due to a shortage of thickness in the annular terminal part or unevenness in contact with a contact surface can be suppressed.

In an aspect (3), a cross-sectional configuration of the hole forming jig in a direction intersecting at right angles to an axis of the hole forming jig is a teardrop configuration in which a part of a circular form as an outline protrudes substantially in a triangular configuration which forms the clearance intruding bulge part.

According to the aspect (3), in the annular conductor which is mounted on the first electrode and has its end side superposed on a root side in a vertical direction, the inner hole has a teardrop configuration in plan view. Into the inner hole, the hole forming jig having a teardrop configuration in its section is inserted. In a usual hole forming jig having a circular configuration in section, a substantially triangular clearance in plan view is formed between an outer periphery of the hole forming jig and an inner surface of the superposed configuration part. As compared therewith, according to the structure of the present invention, the clearance intruding bulge part which bulges outward in a radial direction from an outer periphery of the hole forming jig with the teardrop configuration in section is inserted into the clearance so as to substantially correspond thereto. As a result, a difference between a volume of the annular conductor before the annular conductor is molten and the volume of the cavity which forms the annular terminal part is decreased, so that an occurrence of the shortage of the thickness can be more assuredly suppressed.

According to one or more embodiments, in the die for the terminalized electric wire, the annular conductor can be effectively pressurized and heated to finely form the annular terminal part.

BRIEF DESCRIPTION OF THE DRAWINGS

FIG. 11A is a perspective view of a usual molding electrode. FIG. 11B is a perspective view of main parts of the usual molding electrode when an electric wire is set. FIG. 11C is a perspective view of a terminalized electric wire with an annular terminal part formed.

DETAILED DESCRIPTION

Exemplary embodiments are described below with reference to the drawings.

Figure 1:
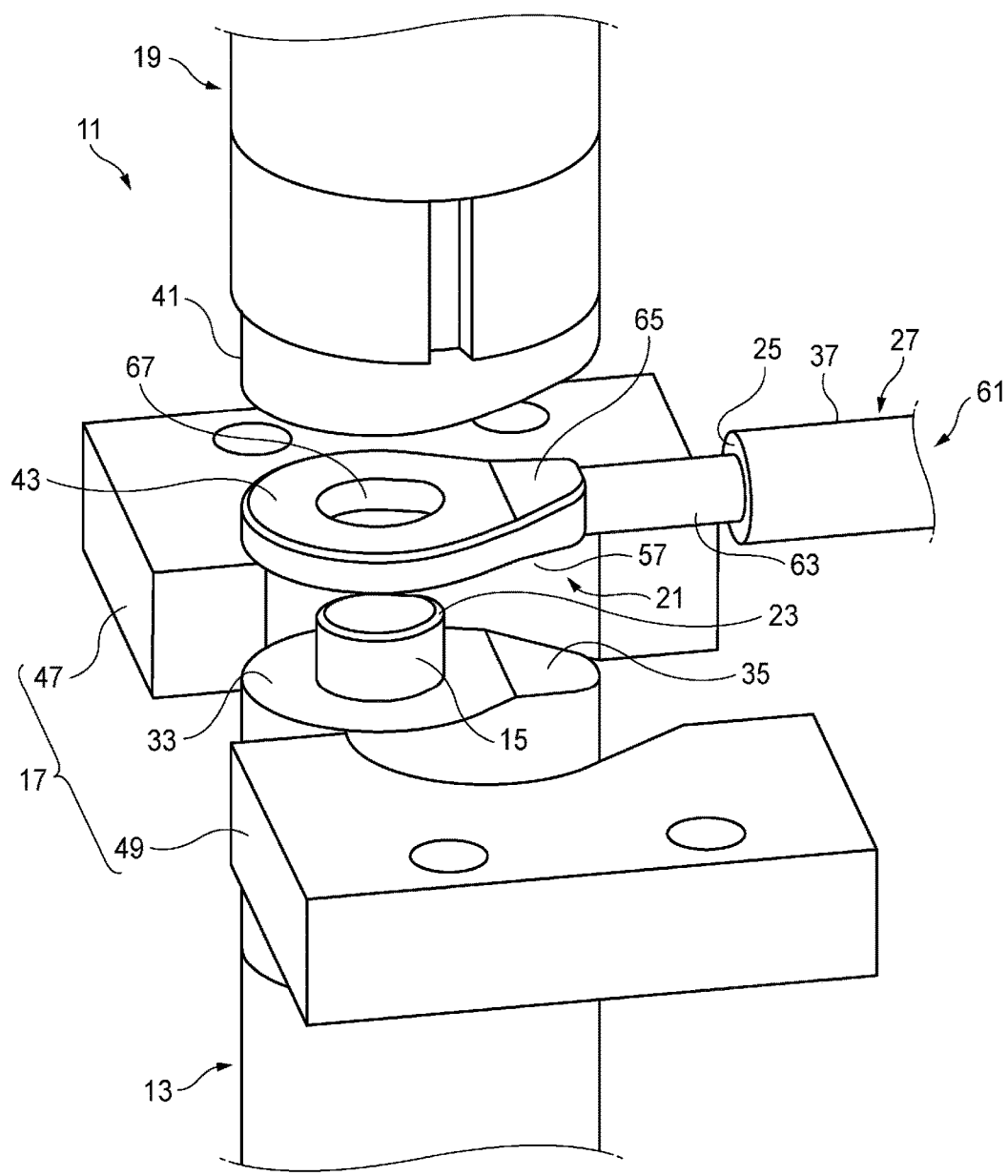
FIG. 1 is a perspective view which shows a die for a terminalized electric wire according to one exemplary embodiment of the present invention together with a terminalized electric wire and an electric wire pressing jig in an opened state.

As shown in FIG. 1, a die 11 for a terminalized electric wire according to one exemplary embodiment of the present invention includes, as main components, a fixed side electrode 13 as a first electrode which is arranged in a lower part, a hole forming jig 15 which is allowed to stand upright on the fixed side electrode 13, an electric wire pressing jig 17 which surrounds a periphery of the fixed side electrode 13, a movable side electrode 19 as a second electrode which is opposed to and arranged in an upper part of the fixed side electrode 13, a conductor accommodation part 21 (see FIG. 5) provided in the electric wire pressing jig 17 and a clearance intruding bulge part 23 formed in the hole forming jig 15.

On the fixed side electrode (the first electrode) 13, an annular conductor 29 of an electric wire 27 in which a coating 25 is removed and an end side of a conductor 63 is superposed on a root side in a vertical direction is mounted. The fixed side electrode 13 is fixed to, for instance, a base (an illustration is omitted).

The hole forming jig 15 is allowed to stand upright on the fixed side electrode 13 (the hole forming jig 15 is formed separately from the fixed side electrode 13 in the present exemplary embodiment, however, the hole forming jig 15 may be formed integrally with the fixed side electrode 13) and passes through an inner hole 31 of the annular conductor 29. The hole forming jig 15 may be formed so as to move downward the fixed side electrode 13 in accordance with a lifting movement of the movable side electrode 19 after the annular conductor 29 is formed.

The fixed side electrode 13 has a fixed side annular forming surface 33 on an upper surface. In the fixed side annular forming surface 33, a fixed side contact pressing surface 35 (see FIG. 4) is continuously formed as a contact pressing surface to be provided along a superposed configuration part 55 of the annular conductor 29 which is superposed in the vertical direction. The fixed side contact pressing surface 35 is formed in an inclined surface so as to be gradually separated from the annular conductor 29 toward an electric wire main body part 37.

Figure 2:
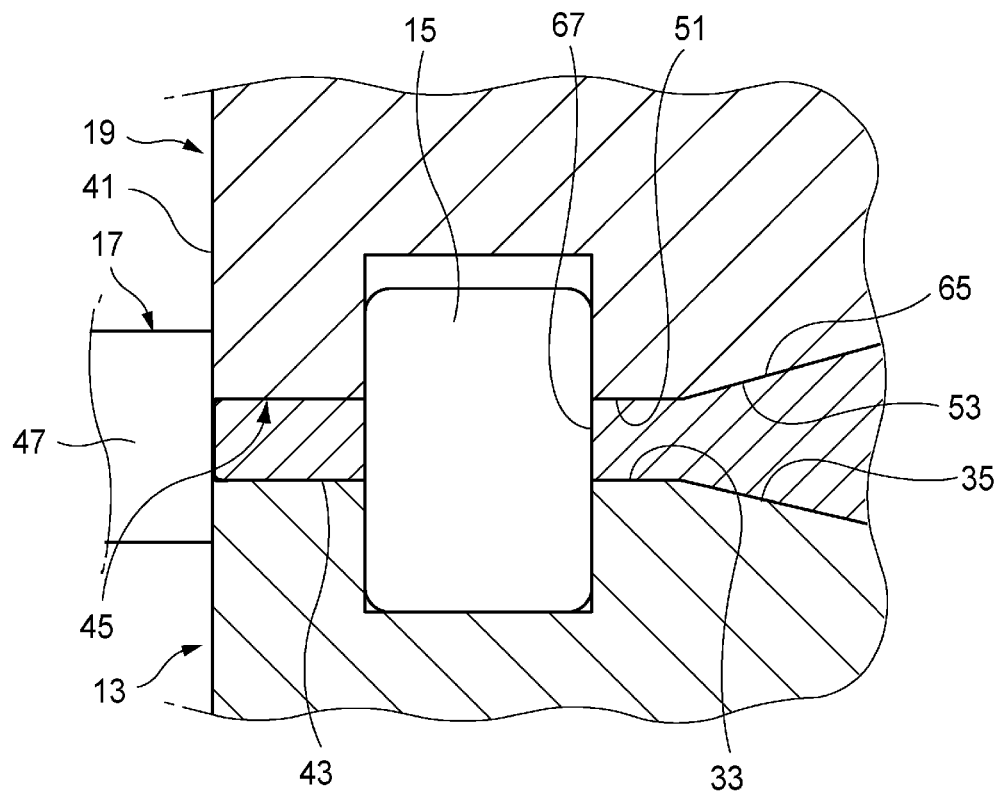
FIG. 2 is a sectional view of main parts of the die for a terminalized electric wire shown in FIG. 1 after an annular conductor is molded.
Figure 3A:
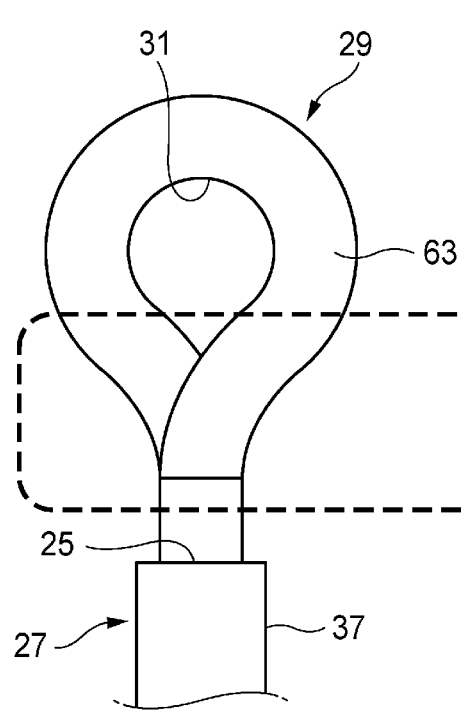
FIG. 3A is a plan view of the annular conductor before the annular conductor is molded.
Figure 3B:
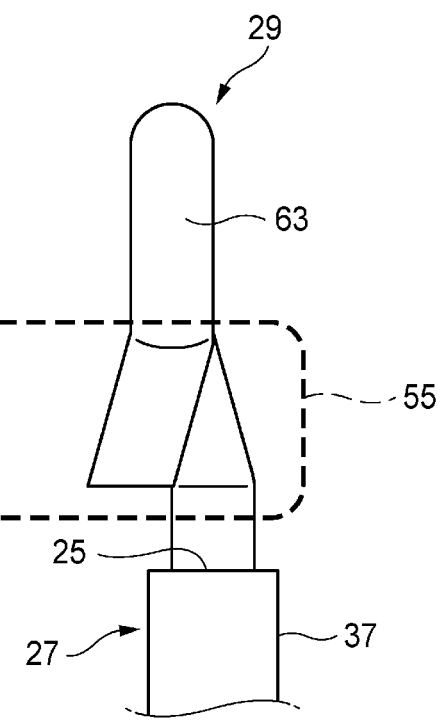
FIG. 3B is a side view of FIG. 3A.

The electric wire pressing jig 17 surrounds the periphery of the fixed side electrode 13. The electric wire pressing jig 17 defines and forms a conductor-forming recessed part 39 (see FIG. 8) having an upper part opened by cooperating with the fixed side electrode 13 arranged in a bottom side. To the conductor-forming recessed part 39, a conductor-pressing protrusion 41 of the below-described movable side electrode (the second electrode) 19 is fitted. The conductor-forming recessed part 39 is fitted to the conductor-pressing protrusion 41, so that a cavity (a space part) 45 (see FIG. 2) is formed as a terminalized part which forms an annular terminal part 43. When the lowered movable side electrode 19 is stopped at a prescribed position of the conductor-forming recessed part 39, the cavity 45 has a prescribed volume. The annular terminal part 43 indicates a molded part after the annular conductor 29 to be molded is molded.

In the present exemplary embodiment, the electric wire pressing jig 17 includes at least one pair of a first electric wire pressing jig 47 and a second electric wire pressing jig 49 which hold the electric wire 27 and the hole forming jig 15 from a direction intersecting at right angles to an axis of the hole forming jig 15. The first electric wire pressing jig 47 and the second electric wire pressing jig 49 are desirably formed with a material (for instance, ceramic or titanium or alloy including ceramic or titanium) which especially hardly adheres to aluminum or aluminum alloy. Thus, a mold releasing property to the annular terminal part 43 formed with the conductor 63 made of aluminum or the aluminum alloy is improved.

The movable side electrode 19 as the second electrode has the conductor-pressing protrusion 41 fitted to the conductor-forming recessed part 39 defined and formed by the fixed side electrode 13 and the electric wire pressing jig 17. The movable side electrode 19 has a movable side annular forming surface 51 in a lower surface of the conductor-pressing protrusion 41. In the movable side annular forming surface 51, a movable side contact pressing surface 53 is continuously formed as a contact pressing surface to be provided along the superposed configuration part 55 of the annular conductor 29. The movable side contact pressing surface 53 is formed in an inclined surface so as to be gradually separated from the annular conductor 29 toward the electric wire main body part 37.

When a prescribed load is applied to the movable side electrode 19 by a pressurizing machine (the illustration is omitted), the movable side electrode 19 pressurizes the annular conductor 29 arranged in the conductor-forming recessed part 39. A prescribed electric current is supplied from a power source to electrically conduct the movable side electrode 19 and the fixed side electrode 13. The electric current applied to the movable side electrode 19 and the fixed side electrode 13 generates Joule heat by a resistance of the conductor itself or a resistance of the contact part. The die 11 for a terminalized electric wire of the present embodiment uses the heat and the pressure of a resistance welding to fuse or melt the annular conductor 29 and form the annular terminal part 43.

Figure 4:
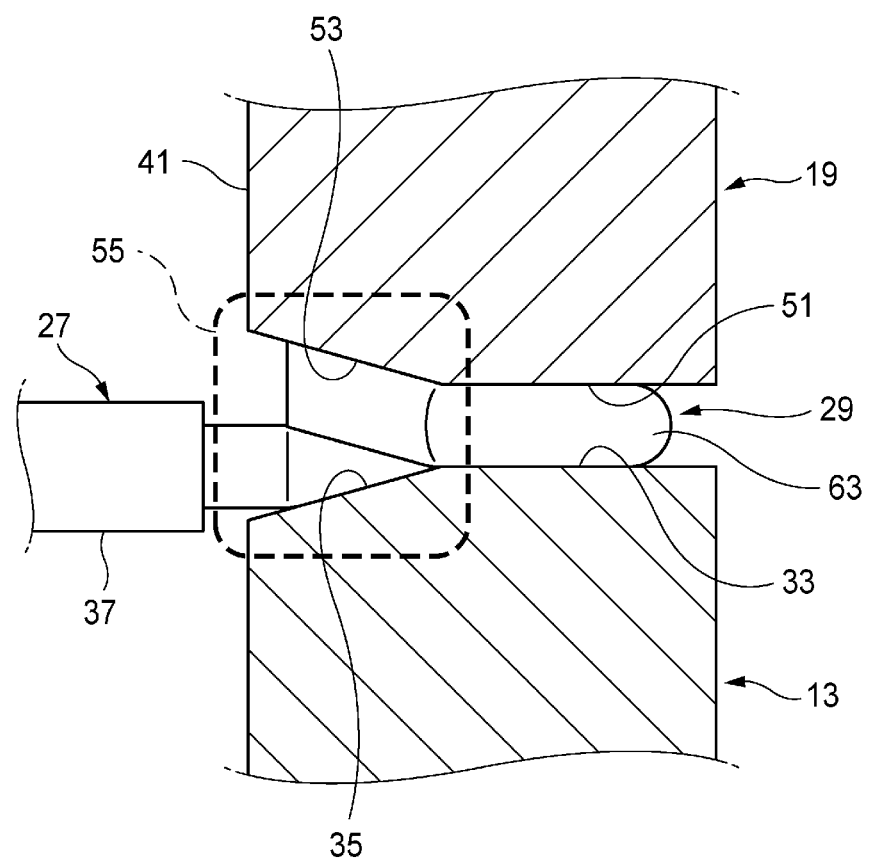
FIG. 4 is a sectional view of a first electrode and a second electrode.

In the present exemplary embodiment, as shown in FIG. 4, the contact pressing surfaces to be provided along the superposed configuration part 55 of the annular conductor 29 are provided as the movable side contact pressing surface 53 and the fixed side contact pressing surface 35 in both the movable side electrode 19 and the fixed side electrode 13. However, in this case, the contact pressing surface of the present invention may be formed at least in one of the fixed side electrode 13 and the movable side electrode 19 so as to be provided along the superposed configuration part 55 in which the end side and the root side of the annular conductor 29 are superposed one upon another in the vertical direction.

Figure 5:
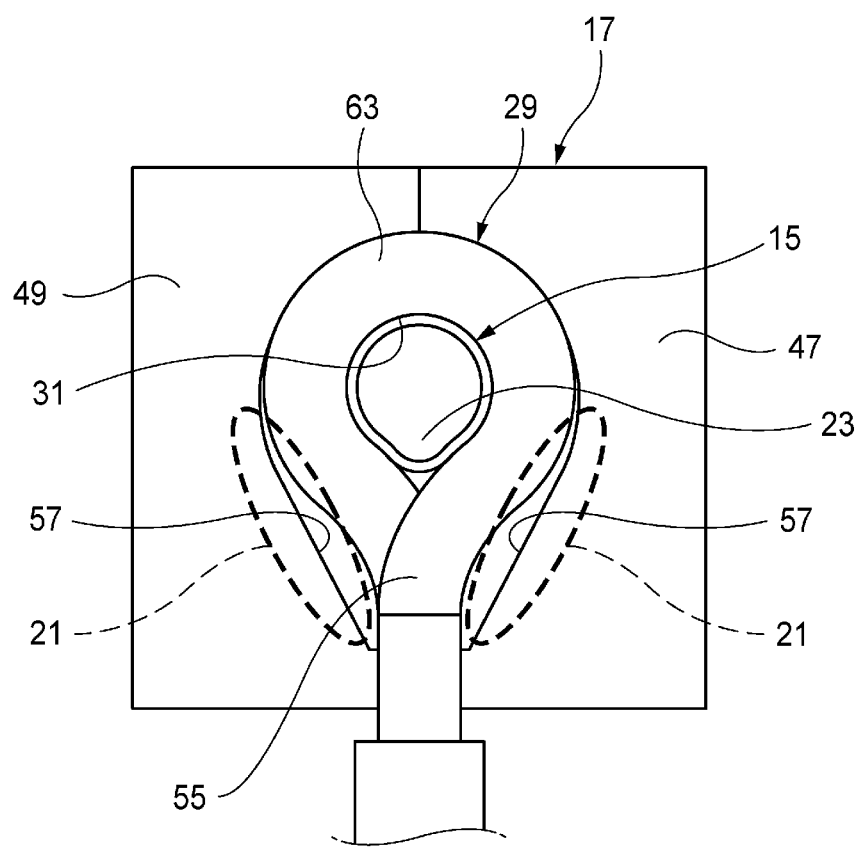
FIG. 5 is a plan view which shows the electric wire pressing jig having conductor accommodation parts formed together with the annular conductor.

The die 11 for a terminalized electric wire of the present exemplary embodiment is provided with the conductor accommodation parts 21 in the first electric wire pressing jig 47 and the second electric wire pressing jig 49 which form the electric wire pressing jig 17. As shown in FIG. 5, the conductor accommodation parts 21 are recessed in molded inner wall surfaces 57 of both the sides of the electric wire pressing jig 17 which hold the superposed configuration part 55 in which the end side and the root side of the annular conductor 29 are superposed one upon another in the vertical direction. Into the one pair of conductor accommodation parts 21, the molten conductor of the superposed configuration part 55 partly flows.

Figure 6A:
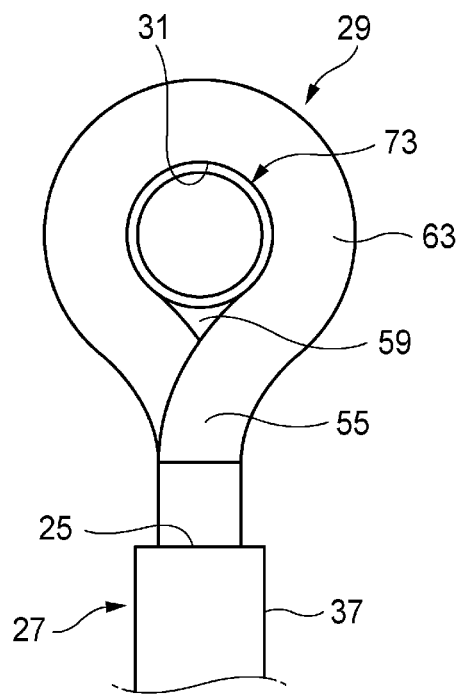
FIG. 6A is a plan view of an annular conductor in which a usual hole forming jig is inserted into an inner hole.
Figure 6B:
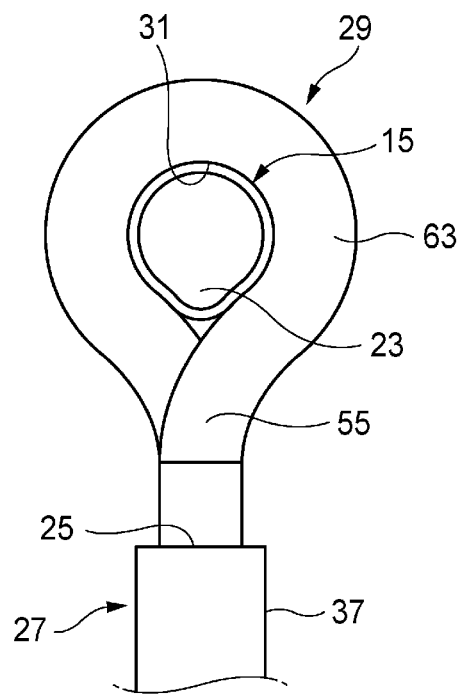
FIG. 6B is a plan view of the annular conductor in which a hole forming jig of a structure according to the present exemplary embodiment is inserted into an inner hole.

In the die 11 for a terminalized electric wire of the present invention, the hole forming jig 15 is provided with the clearance intruding bulge part 23 shown in FIG. 6B. The clearance intruding bulge part 23 fills a clearance 59 (see FIG. 6A) formed between the hole forming jig 15 and an inner surface of the superposed configuration part 55 when the hole forming jig 15 is inserted into the inner hole 31 of the annular conductor 29.

In the present exemplary embodiment, the hole forming jig 15 has, as shown in FIG. 6B, a teardrop configuration in cross-section intersecting at right angles to the axis of the hole forming jig 15. Namely, the clearance intruding bulge part 23 is formed in the teardrop configuration in which a part of a circular form as an outline protrudes substantially in a triangular form that configures the clearance intruding bulge part 23.

In the present exemplary embodiment, is described an example that the inner hole 31 of the annular conductor 29 has a circular form. However, the inner hole 31 may have an elliptic form or a polygonal form as well as the circular form.

Now, will be described a manufacturing method of a terminalized electric wire 61 by using the above-described die 11 for a terminalized electric wire.

The die 11 for a terminalized electric wire according to the present exemplary embodiment is used as one component element of a manufacturing device (an illustration is omitted) of the terminalized electric wire 61 together with the pressurizing machine or the power source. The manufacturing device of the terminalized electric wire 61 is formed by applying, for instance, a resistance welding machine.

In the die 11 for a terminalized electric wire, the first electric wire pressing jig 47 and the second electric wire pressing jig 49 are detachably attached to prescribed positions of the base. As shown in FIG. 1, the first electric wire pressing jig 47 and the second electric wire pressing jig 49 are attached so as to surround the fixed side electrode 13 fixed to the base, so that the conductor-forming recessed part 39 (see FIG. 8) is defined and formed.

Then, in the conductor-forming recessed part 39, the annular conductor 29 in which the conductor 63 of the electric wire 27 is bent in an annular configuration is arranged. In the annular conductor 29, the end side of the conductor 63 exposed by removing the coating 25 is superposed on the root part in the vertical direction to form the superposed configuration part 55. Thus, in the annular conductor 29, a cross-sectional area is increased in the root part.

Figure 7:
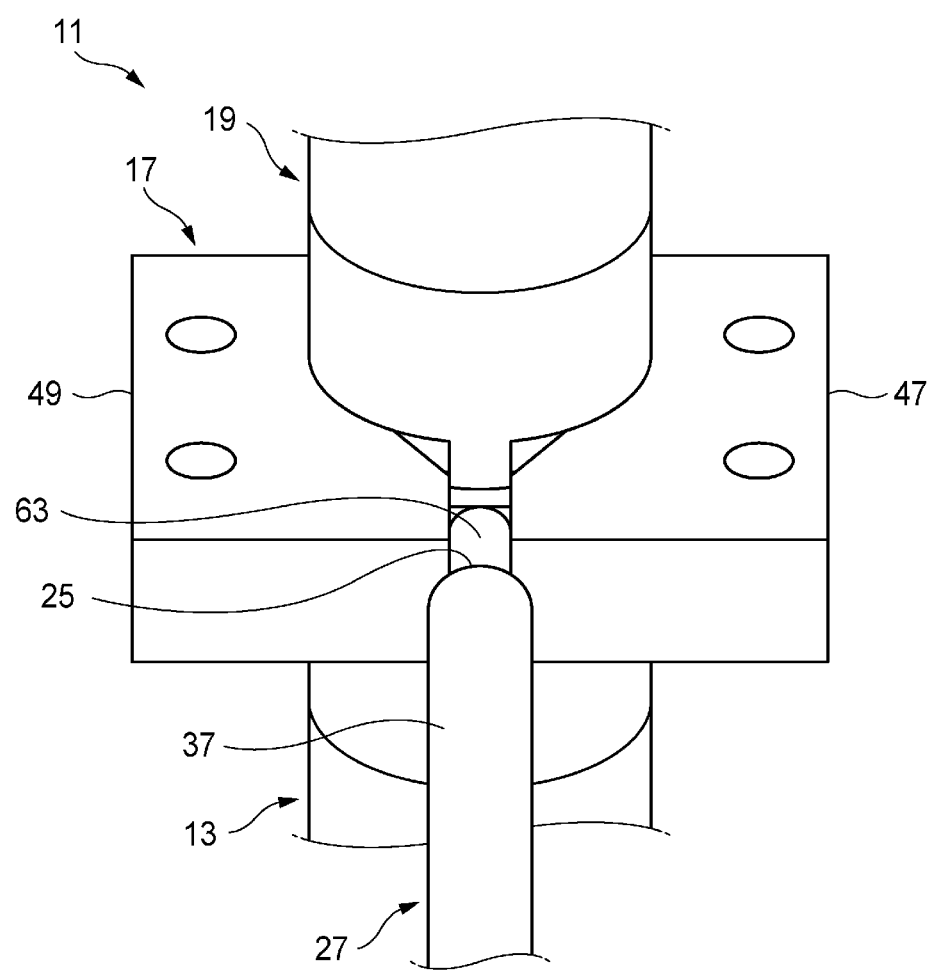
FIG. 7 is a perspective view of the die for a terminalized electric wire during a resistance welding.

Then, in a melting process, as shown in FIG. 7, the conductor-pressing protrusion 41 of the movable side electrode 19 is fitted to the conductor-forming recessed part 39 to pressurize the conductor 63 in the conductor-forming recessed part 39 by the conductor-pressing protrusion 41, and the electric current is supplied to heat and melt or fuse the conductor 63. The annular conductor 29 is molten from an annular part arranged in the periphery of the hole forming jig 15 to the superposed root part by the resistance welding. In the fixed side electrode 13 and the movable side electrode 19, are respectively provided the movable side contact pressing surface 53 and the fixed side contact pressing surface 35 which are gradually separated from the annular conductor 29 toward the electric wire main body part 37. Thus, a terminal root part 65 whose cross-sectional area is gradually increased toward the electric wire main body part 37 is formed between the annular terminal part 43 and the conductor 63 in the electric wire main body part 37 which is not molded (see FIG. 1).

The annular conductor 29 may be preformed so as to be adapted to a configuration of the electric wire before the annular conductor 29 is molten.

Figure 8:
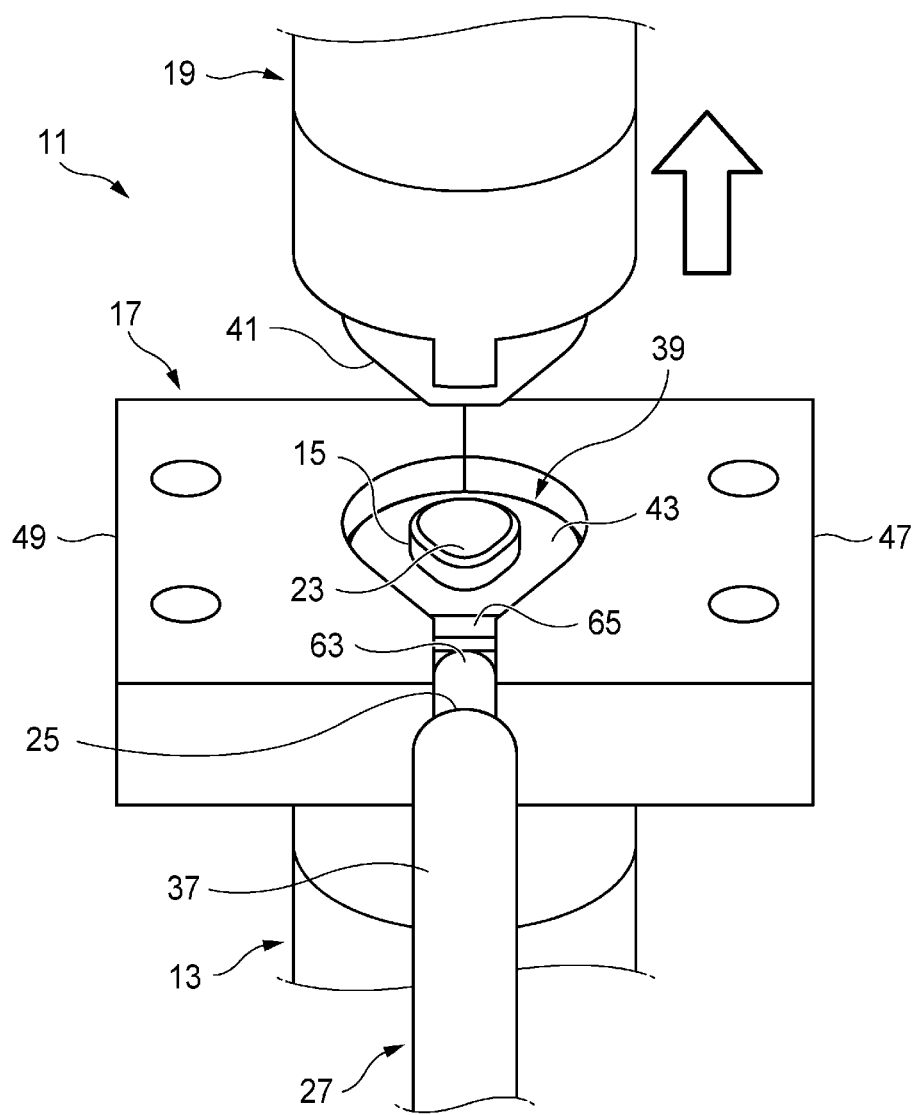
FIG. 8 is a perspective view of the die for a terminalized electric wire when the second electrode is lifted.
Figure 9:
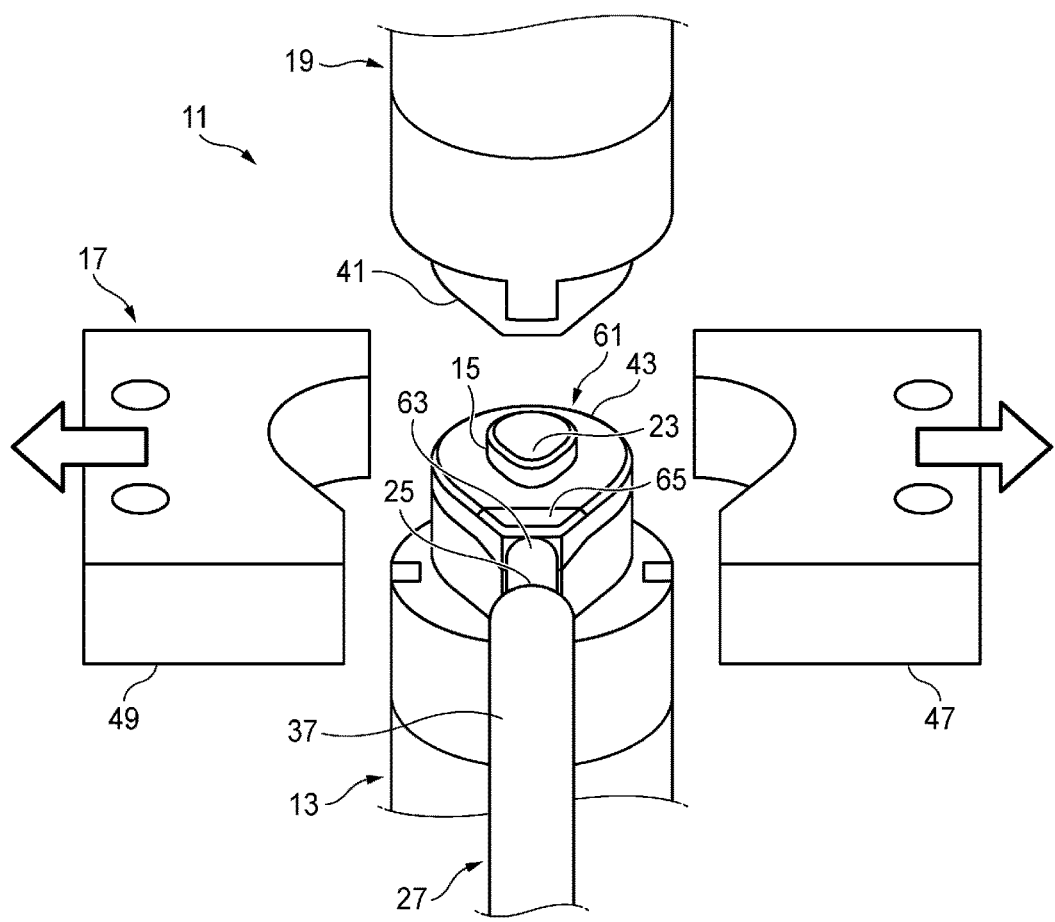
FIG. 9 is a diagram of the die for a terminalized electric wire viewed from a direction shown by an arrow mark when the electric wire is detached.

After an electric current supply operation is finished, as shown in FIG. 8, the movable side electrode 19 is lifted. Thus, an upper surface of the cavity 45 is opened. Then, as shown in FIG. 9, the first pressing jig 47 and the second pressing jig 49 are opened in a horizontal direction. Thus, side surfaces of the cavity 45 are opened, so that the terminalized electric wire 61 can be easily detached.

The terminalized electric wire 61 formed by the above-described die 11 for the terminalized electric wire includes the electric wire main body part 37, the conductor 63 and the annular terminal part 43.

The electric wire main body part 37 is the electric wire 27 in which the conductor 63 is covered with the insulating coating 25. At least in one end side of the electric wire main body part 37, the annular terminal part 43 is formed by pressurizing and heating the conductor 63.

The conductor 63 may be formed with a single wire or a twisted wire formed by twisting a plurality of element wires. As a material of the conductor 63, for instance, aluminum alloy or copper alloy or the like may be exemplified. In the present exemplary embodiment, the coating 25 is removed in a terminal of the electric wire main body part 37 to expose the conductor 63 formed with the twisted wires made of aluminum or the aluminum alloy. In addition thereto, a part in which the conductor 63 is exposed to form the annular terminal part 43 may be an exposed part of an intermediate part of the electric wire main body part 37 in which the coating 25 is removed. In this case, the conductor 63 is bent in an annular configuration so that the electric wire main body parts 37 in both sides which are covered with the coating 25 may be collected so as to be located in the same directions, and arranged in the conductor-forming recessed part 39.

The annular terminal part 43 is formed by pressurizing and heating the conductor 63 with a circular configuration in section which is exposed by removing the coating 25 in such a manner as described above. Namely, in the annular terminal part 43, the exposed conductor 63 is initially bent in the annular configuration. At this time, the end side of the conductor 63 is superposed on the root side in the vertical direction. Thus, the annular terminal part 43 has the root side (a side near the coating 25) provided with a volume two times as large as a volume of other part. Under a state that the conductor 63 bent in the annular configuration is held by the conductor-forming recessed part 39 and the conductor-pressing protrusion 41, the conductor 63 is pressurized and headed. The conductor 63 is molten, then, solidified and formed as the annular terminal part 43 as shown in FIG. 1.

Figure 10:
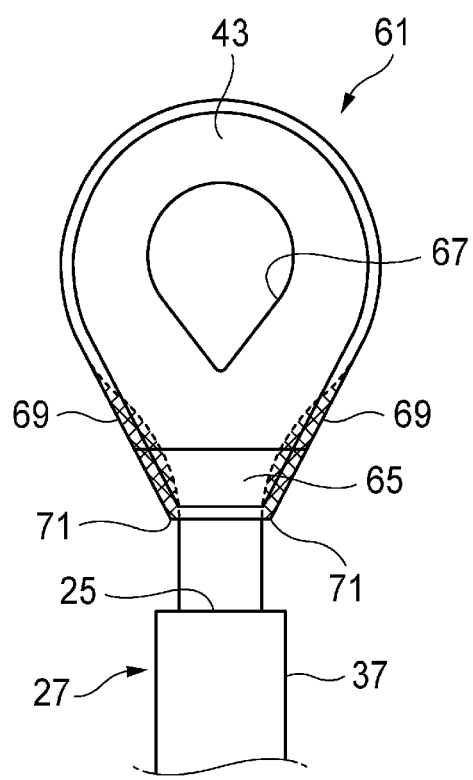
FIG. 10 is a plan view of an annular terminal part a molding operation of which is finished.

As shown in FIG. 10, the annular terminal part 43 is formed as a plate shaped round terminal in which the inner hole 31 at the center is formed as a bolt insert hole 67. Apart between the annular terminal part 43 and the conductor 63 which is not molded is formed as the terminal root part 65. In the terminal root part 65, the end side and the root side of the conductor 63 are superposed one upon another as described above, so that the terminal root part 65 has the cross-sectional area about two times as large as that of other part of the annular terminal part 43. The terminal root part 65 is formed substantially in a truncated pyramidal configuration having a taper by the movable side contact pressing surface 53 and the fixed side contact pressing surface 35. The taper is directed in such a way that the cross-sectional area is gradually increased from the annular part of the annular terminal part 43 toward the conductor 63 which is not molded. In the terminalized electric wire 61, strength between the annular terminal part 43 and the electric wire main body part 37 is assured to be higher than that of other part by the terminal root part 65. Thus, in the terminalized electric wire 61, when the bolt insert hole 67 is fixed by a bolt and even when a tension is applied to the electric wire main body part 37, the terminal root part 65 is hardly broken.

Further, in the annular terminal part 43, padding parts 69 (hatching parts shown in FIG. 10) are formed by the molten conductor accommodated in the conductor accommodation parts 21 in both sides of the terminal root part 65. The padding parts 69 form outlines in plan view which are obtained in such a way that tangential lines of the annular terminal part 43 are respectively connected to terminal ends 71 of the annular terminal part 43 by straight lines. In the terminalized electric wire 61, the strength between the annular terminal part 43 and the electric wire main body part 37 is also assured to be higher than that of other part by the padding parts 69. Thus, in the terminalized electric wire 61, when the bolt insert hole 67 is fixed by the bolt and even when the tension is applied to the electric wire main body part 37, the terminal root part 65 is more hardly broken.

In the terminalized electric wire 61 according to the present exemplary embodiment, adjacent parts of the annular terminal part 43 and the coating 25 of the electric wire main body part 37 may be sometimes integrally covered with a housing molded with an insulating resin by a molding process of the housing as a post-process to form a connector. At this time, in the terminalized electric wire 61, only an inner peripheral edge of the bolt insert hole 67 is exposed outside the housing.

Now, an operation of the die 11 for a terminalized electric wire having the above-described structure will be described below.

In the die 11 for a terminalized electric wire according to the present exemplary embodiment, the annular conductor 29 of the electric wire 27 in which the coating 25 is removed and the end side is superposed on the root side in the vertical direction is mounted on the fixed side electrode 13. Into the inner hole 31 of the annular conductor 29, the hole forming jig 15 of the fixed side electrode 13 passes. The electric wire pressing jig 17 arranged so as to surround the periphery of the fixed side electrode 13 surrounds the periphery of the fixed electrode 13 to define and form the conductor-forming recessed part 39 by cooperating with the fixed side electrode 13 in the bottom side.

To an opening side of the conductor-forming recessed part 39 having the upper part opened, the conductor-pressing protrusion 41 of the movable side electrode 19 is fitted from the upper part. The conductor-pressing protrusion 41 of the movable side electrode 19 is fitted to the conductor-forming recessed part 39 under a prescribed pressure. Further, a voltage is applied between the movable side electrode 19 and the fixed side electrode 13. Accordingly, the annular conductor 29 arranged in the conductor-forming recessed part 39 is temporarily molten by the Joule heat in the cavity 45 which is surrounded by the conductor-forming recessed part 39 and the conductor-pressing protrusion 41 to form a product, and then, solidified and molded by following an inner configuration of the cavity 45.

At this time, in the annular conductor 29, the superposed configuration part 55 is more swollen than other part. The swollen configuration is fused or molten to be lowered by the resistance welding. The molten conductor of the lowered part in the superposed configuration part 55 flows into the conductor accommodation parts 21 recessed in the molded inner wall surfaces 57 of the electric wire pressing jig 17. The molten conductor which flows into the conductor accommodating parts form the padding parts 69 (see FIG. 10) of the annular terminal part 43. Thus, a volume of the molten annular conductor 29 is not larger than a volume of the cavity. As a result, in the annular conductor 29, the molten conductor of the superposed configuration part 55 is accommodated in the cavity 45 without forming burrs or projections, so that the annular terminal part 43 is finely formed as a terminal.

Further, since the fixed side contact pressing surface 35 and the movable side contact pressing surface 53 are formed by following the swollen configuration of the superposed configuration part 55 in the annular conductor 29, the fixed side contact pressing surface 35 and the movable side contact pressing surface 53 can equally come into contact with the surface of the superposed configuration part 55. For instance, when the movable side contact pressing surface 53 formed in the movable side electrode 19 equally comes into contact with the superposed configuration part 55, a difference hardly arises in the Joule heat generated in the annular conductor 29. Namely, unevenness in a molten state or a shrinkage cavity is not generated in the annular conductor 29. As a result, the annular conductor 29 can be effectively molded by following the inner configuration of the cavity 45.

As described above, in the die 11 for a terminalized electric wire of the present exemplary embodiment, the annular terminal part 43 is formed in a configuration following the cavity 45 surrounded by the conductor-forming recessed part 39 and the conductor-pressing protrusion 41. In the annular terminal part 43, since the end part of the conductor 63 is superposed on the root part of the conductor 63 extended from the coating 25 in the vertical direction, the cross-sectional area of the root part (namely, the superposed configuration part 55) is increased. Thus, in the terminalized electric wire 61, the annular terminal part 43 is formed which is provided with the terminal root part 65 high in its strength. As described above, the movable side contact pressing surface 53 and the fixed side contact pressing surface 35 effectively form the annular terminal part 43 high in its strength.

In the die 11 for a terminalized electric wire of the present exemplary embodiment, a center of the superposed configuration part 55 in a direction of thickness (a direction of superposition) corresponds to a center of the annular terminal part 43 in a direction of thickness in which the bolt insert hole 67 is formed. Thus, an outward appearance of the molded terminal root part 65 is improved.

Further, in the die 11 for a terminalized electric wire of the present exemplary embodiment, after the annular conductor 29 is molded, the movable side electrode 19 is initially lifted from the conductor-forming recessed part 39 to open the terminalized part (the cavity 45). Then, the first electric wire pressing jig 47 and the second electric wire pressing jig 49 are opened in the horizontal direction, so that both the side surfaces of the cavity 45 are opened. Thus, the terminalized electric wire 61 can be easily taken out. Accordingly, the terminalized electric wire 61 is not broken due to an unnatural detachment. As a result, a good molding property can be assured.

Further, in the die 11 for a terminalized electric wire of the present exemplary embodiment, the annular conductor 29 is mounted on the fixed side electrode 13 and the hole forming jig 15 of the fixed side electrode 13 passes through the inner hole 31 of the annular conductor 29. Then, into the clearance 59 (see FIG. 6A) formed between the hole forming jig 15 and the inner surface of the superposed configuration part 55, the clearance intruding bulge part 23 formed in the hole forming jig 15 enters. Thus, the clearance is not formed between the inner surface of the superposed configuration part 55 and the hole forming jig 15. As a result, the molten conductor is prevented from entering the clearance 59, so that an insufficient strength due to a shortage of thickness in the annular terminal part 43 or unevenness in contact with a contact surface can be suppressed.

According to the die 11 for a terminalized electric wire of the present exemplary embodiment, in the annular conductor 29 which is mounted on the fixed side electrode 13 and has the end side of the conductor 63 superposed on the root side in the vertical direction, the inner hole 31 has the teardrop configuration in plan view. Into the inner hole 31, the hole forming jig 15 having the teardrop configuration in its section is inserted. In a usual hole forming jig 73 having a circular configuration in section as shown in FIG. 6A, a substantially inverted triangular clearance 59 in plan view is formed between an outer periphery of the hole forming jig 73 and the inner hole 31 of a superposed configuration part 55. As compared therewith, according to the structure of the present exemplary embodiment, as shown in FIG. 6B, the clearance intruding bulge part 23 which bulges outward in a radial direction from an outer periphery of the hole forming jig 15 with the teardrop configuration in section is inserted into the clearance 59 so as to substantially correspond thereto. As a result, a difference between a volume of the annular conductor before the annular conductor is molten and the volume of the cavity which forms the annular terminal part 43 is decreased, so that an occurrence of the shortage of the thickness can be more assuredly suppressed.

Accordingly, in the die 11 for a terminalized electric wire of the present exemplary embodiment, the annular conductor 29 can be effectively pressurized and heated to finely form the annular terminal part 43.

Here, features of the embodiment of the die for a terminalized electric wire according to the present invention described above are briefly summarized and listed as the following [1] to [4].

[1] A die (11) for a terminalized electric wire comprising:
    a first electrode (a fixed side electrode 13);
    a hole forming jig (15);
    an electric wire pressing jig (17) surrounding a periphery of the first electrode (the fixed side electrode 13);
    a second electrode (a movable side electrode 19); and
    conductor accommodation parts (21),
    wherein an annular conductor (29) of an electric wire (27) with a coating (25) removed and with an end side superposed on a root side in a vertical direction is mounted on the first electrode (the fixed side electrode 13), wherein the hole forming jig (15) stands upright on the first electrode (the fixed side electrode 13) and passes through an inner hole (31) of the annular conductor (29), wherein the second electrode (a movable side electrode 19) has a conductor-pressing protrusion (41) which is fitted to a conductor-forming recessed part (39) defined and formed by the first electrode (the fixed side electrode 13) and the electric wire pressing jig (17) so as to pressurize and heat the annular conductor (29) between the first electrode (the fixed side electrode 13) and the second electrode (the movable side electrode 19), wherein the conductor accommodation parts (21) are recessed in molded inner wall surfaces (57) at both sides of the electric wire pressing jig (17) which holds a superposed configuration part (55) in which the end side of the annular conductor (29) is superposed on the root side of the annular conductor (29) in the vertical direction, and wherein a part of a molten conductor of the superposed configuration part (55) flows into the conductor accommodation parts (21).

[2] The die (11) for the terminalized electric wire according to the above-described [1], wherein the hole forming jig (15) has a clearance intruding bulge part (23) which fills a clearance (59) formed between the hole forming jig (15) and an inner surface of the superposed configuration part (55).

[3] The die (11) for the terminalized electric wire according to the above-described [2], wherein a cross-sectional configuration of the hole forming jig (15) in a direction intersecting at right angles to an axis of the hole forming jig (15) is a teardrop configuration in which a part of a circular form as an outline protrudes substantially in a triangular configuration which forms the clearance intruding bulge part (23).

The present invention is not limited to the above-described exemplary embodiment and may be suitably modified and improved. In addition thereto, materials, configurations, dimensions, numbers and arranged positions of the component elements respectively in the above-described exemplary embodiment may be arbitrary and are not limited as long as they can achieve the present invention.

DESCRIPTION OF REFERENCE NUMERALS AND SIGNS

11 . . . die for terminalized electric wire
13 . . . fixed side electrode (first electrode)
15 . . . hole forming jig
17 . . . electric wire pressing jig
19 . . . movable side electrode (second electrode)
21 . . . conductor accommodation part
23 . . . clearance intruding bulge part
25 . . . coating
27 . . . electric wire
29 . . . annular conductor
31 . . . inner hole
39 . . . conductor-forming recessed part
41 . . . conductor-pressing protrusion
55 . . . superposed configuration part
57 . . . molded inner wall surface
59 . . . clearance

What is claimed is:

1. A die for molding a terminalized electric wire from an annular conductor of an electric wire with a coating removed from the annular conductor, the annular conductor includes an inner hole and a superposed configuration part where an end of the electric wire is superposed on a root side of the electric wire, the inner hole of the annular conductor has a teardrop configuration that includes a circular portion and a triangular portion, and the triangular portion extends along the superposed configuration part, the die comprising:

a first electrode including an annular forming surface and a contact pressing surface continuously formed with the annular forming surface, the contact pressing surface being inclined relative to the annular forming surface;
a hole forming jig including an outer peripheral surface;
an electric wire pressing jig including an inner wall surface that extends around the outer peripheral surface of the hole forming jig;
a second electrode; and
conductor accommodation parts,
wherein the annular conductor of the electric wire with the coating removed and with the end superposed on the root side is to be mounted on the first electrode,
wherein the hole forming jig extends away from the annular forming surface of the first electrode and is configured to pass through the inner hole of the annular conductor,
wherein the second electrode has a conductor-pressing protrusion which is configured to be fitted to a conductor-forming recess defined and formed by the first electrode and the electric wire pressing jig so as to pressurize and heat the annular conductor between the first electrode and the second electrode, the conductor-pressing protrusion protrudes toward the annular forming surface and the contact pressing surface when the conductor-pressing protrusion is fitted in the conductor-forming recess,
wherein the conductor accommodation parts are opposed surface portions of the inner wall surface of the electric wire pressing jig which are configured to hold the superposed configuration part,
wherein the conductor accommodation parts are configured so that a part of a molten conductor of the superposed configuration part flows to the conductor accommodation parts,
wherein the hole forming jig includes a clearance intruding bulge part that is a bulge in the outer peripheral surface of the hole forming jig, and the clearance intruding bulge part is configured to extend into the triangular portion of the inner hole of the annular conductor,
wherein the clearance intruding bulge part bulges toward the contact pressing surface, and
wherein the electric wire pressing jig is movable relative to the first electrode and the second electrode.

2. The die for molding the terminalized electric wire according to claim 1,
wherein a cross-sectional configuration of the hole forming jig in a direction intersecting at right angles to an axis of the hole forming jig is a teardrop configuration in which a part of a circular form as an outline protrudes substantially in a triangular configuration which forms the clearance intruding bulge part.

3. The die for molding the terminalized electric wire according to claim 1,
wherein the electric wire pressing jig is movable relative to the hole forming jig.

4. A die for molding a terminalized electric wire from an annular conductor of an electric wire with a coating removed from the annular conductor, the annular conductor includes an inner hole and a superposed configuration part where an end of the electric wire is superposed on a root side of the electric wire, the inner hole of the annular conductor has a teardrop configuration includes a circular portion and a triangular portion, and the triangular portion extends along the superposed configuration part, the die comprising:
- a first electrode including an annular forming surface and a contact pressing surface continuously formed with the annular forming surface, the contact pressing surface being inclined relative to the annular forming surface;
- a hole forming jig including an outer peripheral surface;
- an electric wire pressing jig including an inner wall surface that extends around the outer peripheral surface of the hole forming jig;
- a second electrode; and
- conductor accommodation parts,
- wherein the annular conductor of the electric wire with the coating removed and with the end superposed on the root side is to be mounted on the first electrode,
- wherein the hole forming jig extends away from the annular forming surface of the first electrode and is configured to pass through the inner hole of the annular conductor,
- wherein the second electrode has a conductor-pressing protrusion which is configured to be fitted to a conductor-forming recess defined and formed by the first electrode and the electric wire pressing jig so as to pressurize and heat the annular conductor between the first electrode and the second electrode, the conductor-pressing protrusion protrudes toward the annular forming surface and the contact pressing surface when the conductor-pressing protrusion is fitted in the conductor-forming recess,
- wherein the conductor accommodation parts are opposed surface portions of the inner wall surface of the electric wire pressing jig which are configured to hold the superposed configuration part,
- wherein the conductor accommodation parts are configured so that a part of a molten conductor of the superposed configuration part flows to the conductor accommodation parts,
- wherein the hole forming jig includes a clearance intruding bulge part that is a bulge in the outer peripheral surface of the hole forming jig, and the clearance intruding bulge part is configured to extend into the triangular portion of the inner hole of the annular conductor,
- wherein the clearance intruding bulge part bulges toward the contact pressing surface,
- wherein the electric wire pressing jig is movable relative to the first electrode, and
- wherein the electric wire pressing jig includes a first electric wire pressing jig and a second wire electric pressing jig that are movable toward and away from each other.

5. A die for molding a terminalized electric wire from an annular conductor of an electric wire with a coating removed from the annular conductor, the annular conductor includes an inner hole and a superposed configuration part where an end of the electric wire is superposed on a root side of the electric wire, the inner hole of the annular conductor has a teardrop configuration includes a circular portion and a triangular portion, and the triangular portion extends along the superposed configuration part, the die comprising:
- a first electrode including an annular forming surface and a contact pressing surface continuously formed with the annular forming surface, the contact pressing surface being inclined relative to the annular forming surface;
- a hole forming jig including an outer peripheral surface;
- an electric wire pressing jig including an inner wall surface that extends around the outer peripheral surface of the hole forming jig;
- a second electrode; and
- conductor accommodation parts,
- wherein the annular conductor of the electric wire with the coating removed and with the end superposed on the root side is to be mounted on the first electrode,
- wherein the hole forming jig extends away from the annular forming surface of the first electrode and is configured to pass through the inner hole of the annular conductor,
- wherein the second electrode has a conductor-pressing protrusion which is configured to be fitted to a conductor-forming recess defined and formed by the first electrode and the electric wire pressing jig so as to pressurize and heat the annular conductor between the first electrode and the second electrode, the conductor-pressing protrusion protrudes toward the annular forming surface and the contact pressing surface when the conductor-pressing protrusion is fitted in the conductor-forming recess,
- wherein the conductor accommodation parts are opposed surface portions of the inner wall surface of the electric wire pressing jig which are configured to hold the superposed configuration part,
- wherein the conductor accommodation parts are configured so that a part of a molten conductor of the superposed configuration part flows to the conductor accommodation parts,
- wherein the hole forming jig includes a clearance intruding bulge part that is a bulge in the outer peripheral surface of the hole forming jig, and the clearance intruding bulge part is configured to extend into the triangular portion of the inner hole of the annular conductor,
- wherein the clearance intruding bulge part bulges toward the contact pressing surface,
- wherein the electric wire pressing jig is movable relative to the first electrode,
- wherein each of the first and second electrodes includes an outside wall, and
- wherein the electric wire pressing jig abuts the outside wall of the first electrode and the outside wall of the second electrode.

* * * * *